United States Patent [19]
Davignon

[11] Patent Number: 5,968,350
[45] Date of Patent: Oct. 19, 1999

[54] DEVICE FOR CLEANING TRASH RACKS

[75] Inventor: Christian Davignon, Granby, Canada

[73] Assignee: Carold Breton, Lac Brome, Canada

[21] Appl. No.: 09/115,649

[22] Filed: Jul. 15, 1998

[51] Int. Cl.[6] ............................... E02B 5/08; B01D 29/64
[52] U.S. Cl. ......................... 210/159; 210/162; 210/413; 210/541
[58] Field of Search .................................. 210/159, 162, 210/413, 541

[56] References Cited

U.S. PATENT DOCUMENTS

| | | |
|---|---|---|
| 2,784,845 | 3/1957 | Sturzenegger . |
| 3,193,104 | 7/1965 | Leach . |
| 4,218,319 | 8/1980 | Hansson . |
| 4,222,878 | 9/1980 | Hansson . |
| 5,032,263 | 7/1991 | Reidzinski . |
| 5,074,996 | 12/1991 | Galanty . |
| 5,167,803 | 12/1992 | Newton . |
| 5,246,573 | 9/1993 | Lodholz . |
| 5,571,406 | 11/1996 | Mensching . |
| 5,718,771 | 2/1998 | Cassell . |

*Primary Examiner*—Thomas M. Lithgow
*Attorney, Agent, or Firm*—Eric Fincham

[57] ABSTRACT

A cleaning device for moving debris adjacent a trash rack, the device having a mounting base for mounting the device adjacent the trash rack and a longitudinally extending arm having a first end and a distal end, the arm being capable of being driven in a direction generally parallel to the longitudinal axis of the arm, a debris collecting assembly located at the arm distal end, the debris collecting assembly comprising a fixed jaw mounted on the arm and a mobile jaw moveably connected to the fixed jaw by a jaw connecting structure to allow the mobile arm to both pivot and move inwardly with respect to the fixed jaw.

15 Claims, 18 Drawing Sheets

FIG_3

DEVICE FOR CLEANING TRASH RACKS

FIELD OF THE INVENTION

The present invention relates to the field of trash racks or screens and is particularly concerned with a method and device for cleaning trash racks or screens.

BACKGROUND OF THE INVENTION

Mechanical bar screens are frequently used in a variety of circumstances, for example, to prevent debris from entering a pump, a turbine, a water treatment device or other liquid dependent apparatus. Indeed, canals, irrigation channels and the like are frequently contaminated with so-called "natural" debris such as the limbs of trees, blocks of ice and like and with so-called "man-made" debris such as tires, bottles and the like. If such debris were permitted to enter a water dependent apparatus, such apparatus could be severely damaged or ruined.

In order to protect water dependent apparatus, it is common practice to mount a mechanical bar screen commonly referred to as a trash rack in the liquid, upstream from the apparatus to be protected. Such trash racks usually include a plurality of bars in closely spaced, side-by-side relationship relative to each other so as to define a corresponding plurality of relatively narrow and elongated flow openings. The flow openings typically have a width narrower than the width of solid material to be screened so as to allow for separation of the solid materials from the liquid flow stream.

One of the disadvantages associated with the use of conventional trash racks is that they have a tendency to become clogged with trash and other debris so as to eventually severely restrict or even terminate the flow of water to the pump or other apparatus. A recurrent cleaning of the trash rack therefore has to be performed in order to maintain proper flow to the pump, turbine or other water treating apparatus.

The prior art shows various examples of devices specifically designed for cleaning so-called trash racks. Some of these devices are particularly complex. For example, U.S. Pat. No. 4,107,040 discloses a rake member which is moved along an asymmetric S-shaped curve by a plurality of articulated arms and driven chains which are passed around a number of chain wheels to generate the asymmetric S-shaped curve. While the device may positively engage a bar screen, it is somewhat unwieldy and occupies a rather large volume. Various other rather mechanically complex trash racks are shown in the prior art. These mechanically complex trash rack cleaning devices have failed to provide satisfactory results, at least in part because of their inherent tendency towards mechanical failure and breakdown. Furthermore, their inherent somewhat prohibitive cost has rendered them unpopular. Hence, in the competitive field of trash rack cleaning devices, mechanically complex structures have failed to provide adequate results and generally have not succeeded commercially.

Two types of trash rack cleaning devices having simpler structures have succeeded in obtaining at least a partial commercial success. The first so-called "cable" type of structure is exemplified by the invention described in the Swiss patent specification No. 396,779. This type of structure includes a carriage suspended from a lift wire in abutting contact with the trash rack. The carriage is provided with teeth extending between the bars of the trash rack. A bucket is hingedly mounted to the carriage. When the carriage is allowed to drop by the action of gravitational forces, the bucket is pivoted away from the trash rack. When the carriage is pulled upwardly by the lift wire, the bucket collects the trash which has been gathered at the trash rack.

Although more reliable and less costly than the above-mentioned mechanically complex structures, the so-called "cable" type of the trash rack cleaning devices using raking components suspended by hanging wires suffer from at least two major drawbacks. First, since the wires are by nature relatively flexible and since the device relies on gravitational force for lowering the raking component, the latter may be impossible to lower when it encounters an obstacle during its descending action. Furthermore, when relatively large solid debris is present adjacent the surface of the liquid, the lack of downward pushing force may not allow the raking component to get at the debris in an attempt to move it as a whole.

A second major drawback associated with the so-called "cable" type of cleaning devices is that they are susceptible to being affected by side streams. The problem is compounded by the fact that such side streams are particularly prevalent when trash racks become obstructed.

A second type of cleaning device presenting a relatively simple structure and having achieved some commercial success is the so-called "arm" type of cleaning device. The arm-type cleaning device is exemplified by the structure disclosed in Swedish patent specification No. 302,430 and Canadian Patent No. 1,115,646.

Swedish patent specification No. 302,430 discloses a device including a rake member mounted at the distal end of a rake arm. An hydraulic mechanism is used to lower the rake adjacent the bottom of the rack with the rack member spaced from the latter. The rake member is then pressed against the trash rack before the rake arm is lifted, thus lifting the trash gathered at the trash rack towards a disposal container or chute.

Canadian Patent No. 1,115,646 discloses a trash rack cleaning device which attempts to overcome some of the above-mentioned inherent drawbacks. The structure disclosed in Canadian Patent No. 1,115,646 includes a rake member having a generally wedge-shaped body defined between wedge forming surfaces. The rake member is pivotally mounted at a distal end of the rake arm. An hydraulic mechanism is used for moving the rake arm along the trash rack and for pivoting the rake member between a scraping configuration assumed during downward movement of the rake arm and a scooping configuration assumed during the upward movement of the rake arm.

In the scraping configuration, the rake member is angled so that it engages the trash rack only with its apex, thus showing the trash gathered at the trash rack and allowing some of the smaller debris to pass between the trash rack bars. In the scooping configuration, the rake member has one of its surfaces pressed flush against the trash rack and another of its surfaces scoops the remaining trash upwardly.

Although the above-mentioned structure succeeds in allowing some of the smaller debris to flow through the trash rack bars, in situations wherein the debris is clogged together or wherein the debris is relatively large, this strategy may not always be successful and, hence, the inherent operational demands of the device are such that the device must be oversized to account for situations wherein large debris obstructs the trash rack. Indeed, it must be sized so as to be able to push on relatively large and heavy debris. Furthermore, in some situations, it may not be desirable to allow smaller debris to flow between the trash rack bars since such smaller debris may damage the downstream equipment such as turbines, pumps or the like.

As outlined above, one of the major drawbacks associated with prior art cleaning devices is that the inherent operational demands are such that they must be oversized to withstand the mechanical stresses that are seldom encountered. Thus, not only is the device oversized for most of its working cycles but a considerable amount of energy is wasted moving oversized components during the cleaning cycles. Indeed, since such devices must clean the trash rack by upwardly scooping the debris, they must access a position underneath the debris. In order to do so, they must be sized so as to be able to travel through relatively solid and large obstacles. Furthermore, in the event that the debris forms a large accumulation, the device must be sized to withstand the forces generated by the weight of the whole pile.

One of the main advantages of the present invention resided in that the nibbling capacity of the device allows the latter to divide relatively large debris into smaller debris and thus eliminates the need for oversizing the device so as to be able to clean relatively large debris that are only seldom encountered. The nibbling operation can also be performed for allowing the raking component to travel through relatively large solid obstacles during its cleaning cycle.

SUMMARY OF THE INVENTION

Accordingly, it is an object of the present invention to provide an improved method and device for cleaning trash racks.

It is a further object of the present invention to provide a cleaning device for trash racks that can be used to efficiently remove debris from a trash rack.

A further object of the present invention is to provide a cleaning device for trash racks that prevents debris from accumulating near the bottom of the trash rack when its rake component is used as a scraper in a downward movement to scrape debris having adhered to the trash rack.

A still further object of the present invention is to provide a cleaning device for trash racks that has a built-in means for customizing the distance between its rake component and the trash rack so as to compensate for inherent variations in trash rack design and manufacturing precision.

A still further object of the present invention is to provide a cleaning device for trash racks that conforms to conventional forms of manufacturing, is of simple construction and easy to use so as to provide a trash rack cleaning device that is economically feasible, long-lasting and relatively trouble-free in operation.

According to one aspect of the present invention, there is provided a cleaning device for removing debris located adjacent a trash rack, the trash rack including at least two trash bars positioned in a relatively parallel relationship relative to each other so as to define at least one corresponding flow channel therebetween, the cleaning device comprising a device mounting base for mounting the device adjacent the trash rack; a longitudinally extending member movably mounted on the device mounting base, the longitudinally extending member having a first end and a longitudinally opposed distal end; drive means for moving the longitudinally extending member relative to the device mounting base in a direction generally parallel to a longitudinal axis of the longitudinally extending member, a debris collecting means for collecting the debris, the debris collecting means being mounted on the longitudinally extending member adjacent the distal end, the debris collecting means including a fixed jaw mounted on the longitudinally extending member and a mobile jaw movably connected to the fixed jaw by a jaw connecting structure, the jaw connecting structure allowing the mobile jaw to both pivot and move linearly with respect to the fixed jaw.

In a preferred embodiment, the fixed jaw has a fixed jaw bottom wall and a pair of fixed jaw side walls extending therefrom, an axle mounted on the fixed jaw, the mobile jaw being pivotably mounted on the axle, an axle guiding means for allowing the axle to move within the axle guiding means to thereby permit the mobile jaw to move linearly with respect to the fixed jaw.

In one particular embodiment, the fixed jaw has a fixed jaw bottom and a pair of fixed jaw side walls extending therefrom, a guiding means including a pair of guiding slots formed in each of the fixed jaw side walls, the axle extending between the fixed jaw side walls and being located at opposed longitudinal ends thereof, the axle being respectively inserted within corresponding guiding slots.

Preferably, each of the guiding slots has a generally L-shaped configuration defining a slot proximal segment extending in a direction generally parallel to the fixed jaw bottom wall and a slot distal segment extending at an angle relative to the slot proximal segment in a direction away from the fixed jaw.

BRIEF DESCRIPTION OF THE DRAWINGS

An embodiment of the present invention will now be described, by way of example, in reference to the following drawings in which:

FIGS. 11, 11A and 11B are side views schematically illustrating the motions for removal of debris from a trash rack;

DETAILED DESCRIPTION OF THE INVENTION

Figure 1:
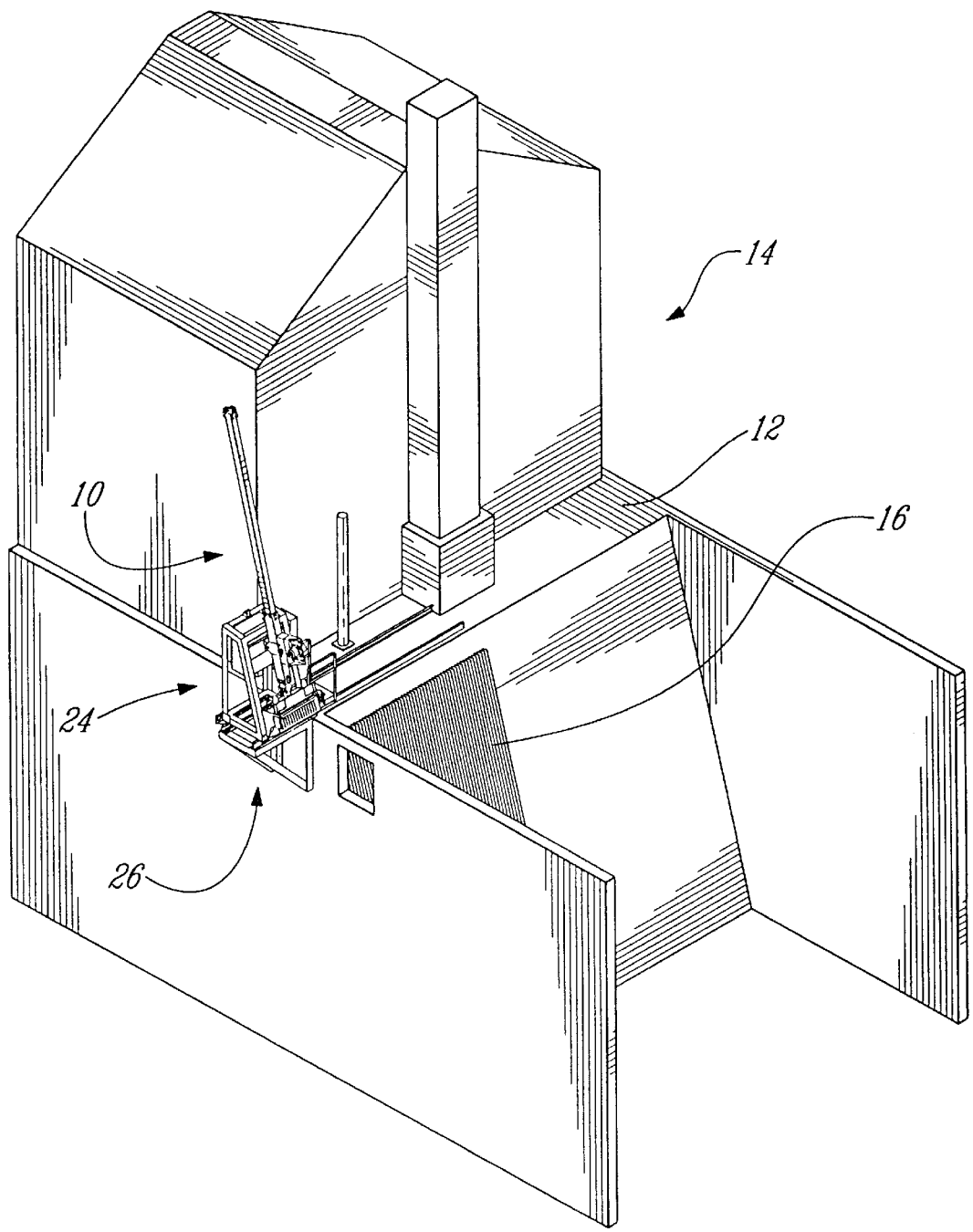
FIG. 1, in a front perspective view, illustrates a trash rack cleaning device in accordance with a first embodiment of the present invention mounted at a water intake plant.
Figure 2:
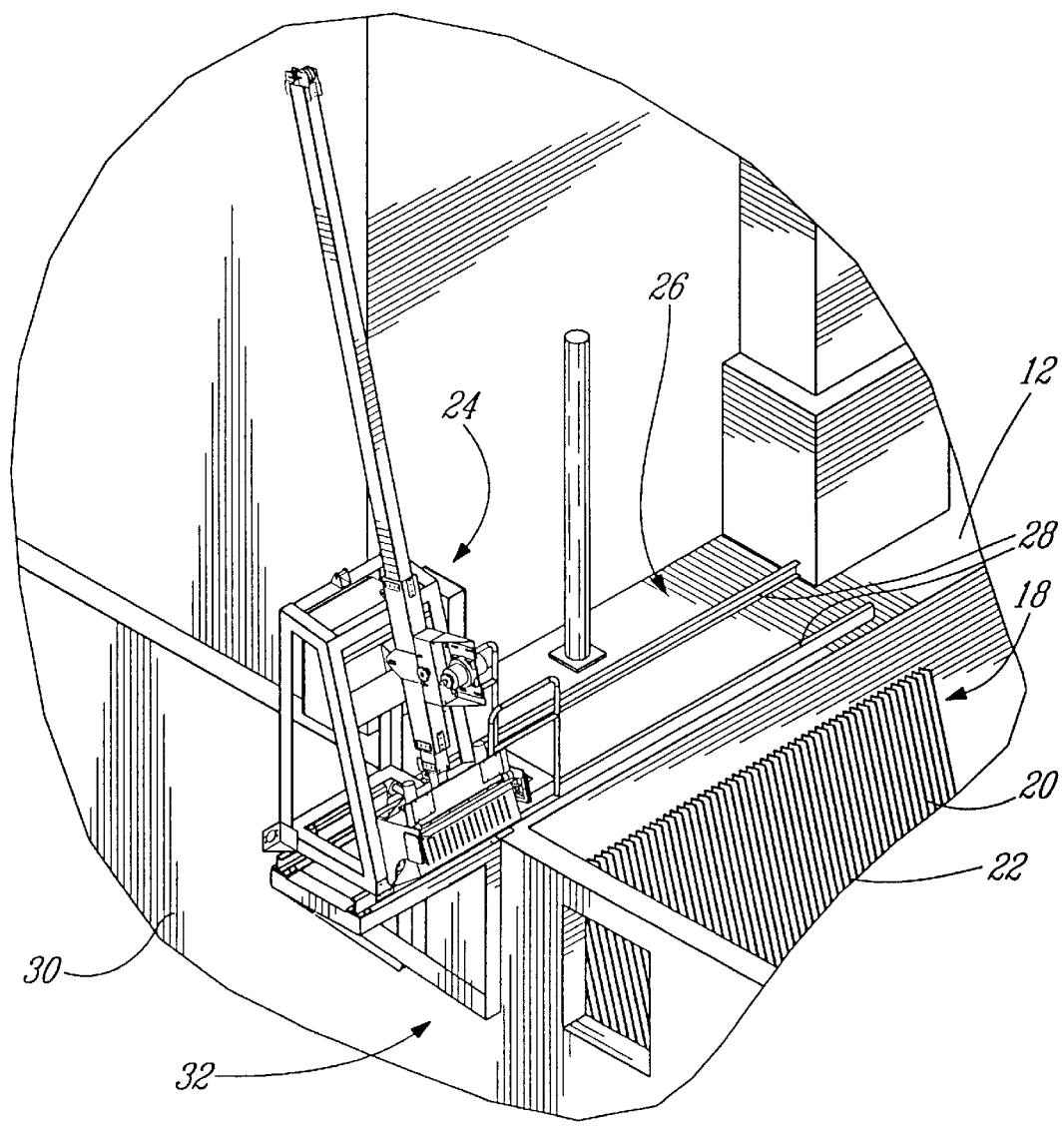
FIG. 2 is an enlarged view of the trash rack cleaning device shown in FIG. 1.

Referring to FIG. 1, there is shown, in a perspective view, a trash rack cleaning device 10 in accordance with a first embodiment of the present invention. The cleaning device 10 is shown mounted on a platform 12 part of a liquid treating plant 14. The platform 12 is positioned adjacent a water intake 16. It should be understood that the water intake 16 could be a turbine intake, a fresh water intake, a waste water purifying plant intake or any other suitable water intake without departing from the scope of the present invention.

A conventional trash rack 18 spans across the water intake 16. The trash rack 18 includes an array of bars 20 positioned in a relatively parallel relationship relative to each other so as to define substantially elongated flow channels 22 therebetween.

The cleaning device 10 includes a carriage component 24 slidably mounted on a base component 26 so as to allow translational travel thereacross. In a preferred embodiment of the invention, the base component 26 includes a pair of elongated guiding rails 28 that are fixed in a parallel and spaced apart relationship relative to each other on the platform 12. In situations wherein the base member 26 is positioned adjacent a side wall 30 part of the water treatment plant 14, a mounting bracket 32 may extend integrally from a lower surface of the guiding rails 28 adjacent the longitudinal end thereof so as to further stabilize the guiding rails 28 on the platform 12.

Figure 3:
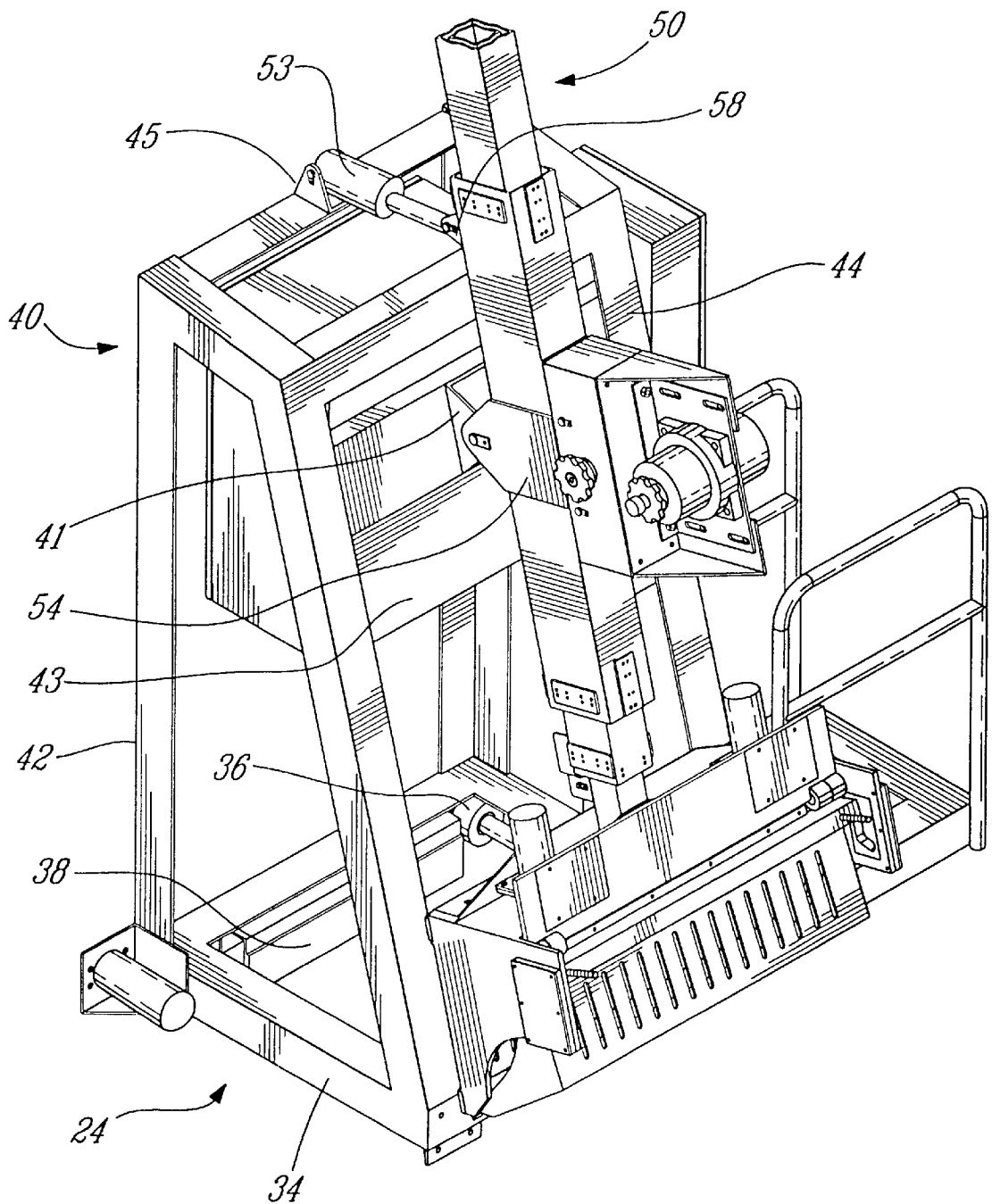
FIG. 3 is a front perspective view of a trash rack cleaning device removed from the mounting rail.
Figure 4:
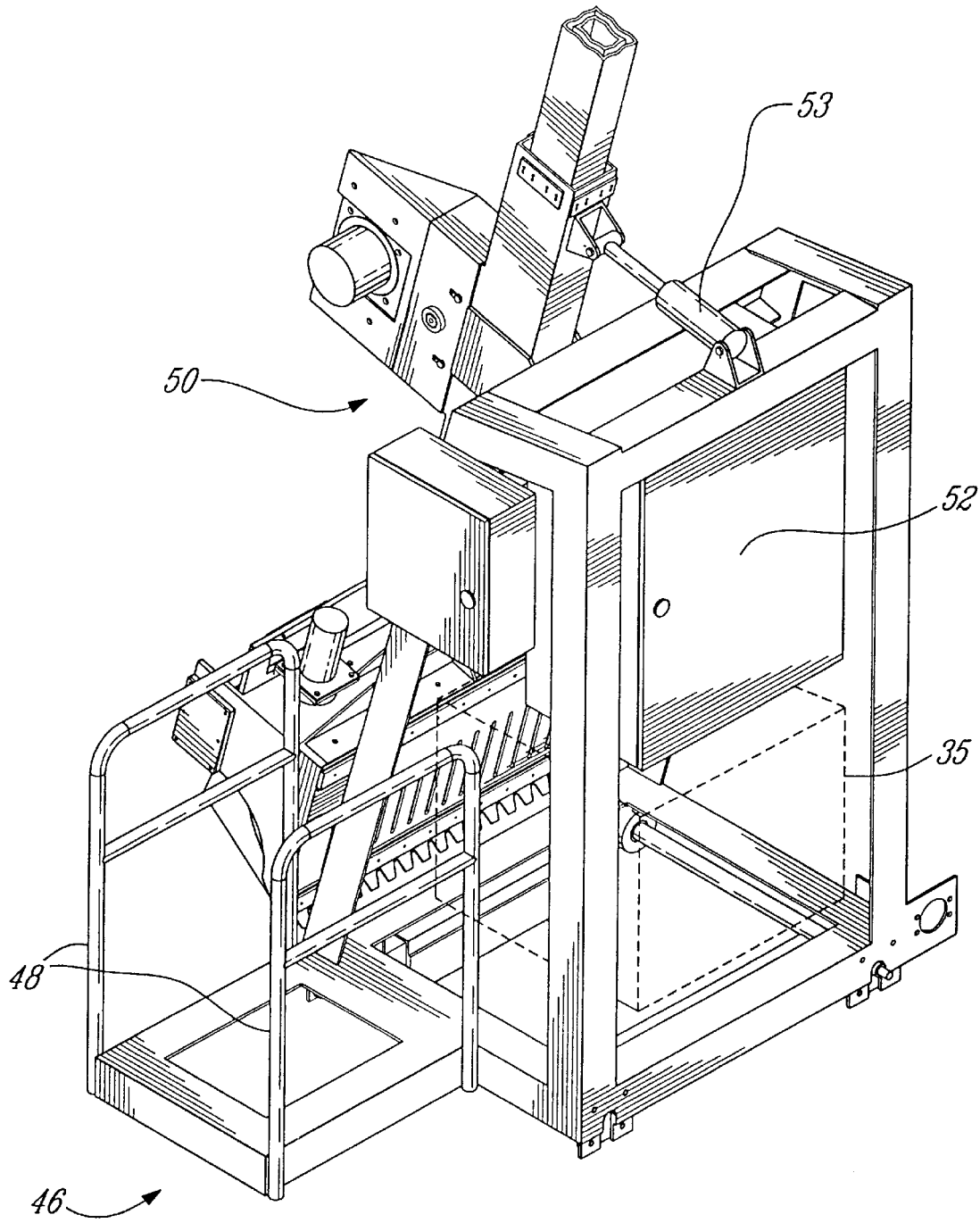
FIG. 4 is a rear perspective view thereof.

Referring now more specifically to FIGS. 3 and 4, there is shown in greater details the cleaning device 10 removed from its base 26. The carriage component 24 typically includes a base main platform 34 having a generally rectangular configuration. A set of wheels 36 are preferably mounted underneath the base main platform 34. Wheels 36 are configured and sized so as to be able to roll on the rails 28. A set of wheel support brackets 38 are also preferably mounted on the base main platform 34 so as to cooperate with the rails 28 to guide the carriage component 24 on the guiding rails 28 and to hold down the device during its operation.

Carriage component 24 further includes a carriage frame 40 extending substantially upwardly from the carriage main platform 34. The supporting frame 40 preferably defines a frame rear section 42 extending substantially perpendicularly from the frame main platform 34 and a frame front section 44 extending at an angle relative to the frame main platform 34 so that the upper section of the frame front section 44 extends towards the frame rear section 42. A frame auxiliary platform 46 extends sidewardly from the frame main platform 34. The frame auxiliary platform 46 is provided with hand rails 48. The frame auxiliary platform 46 is configured and sized to receive an intended user and is provided to allow such an intended user access to the device 10 while being supported on a rigid structure.

A longitudinally extending member or means comprising an arm component 50 is mounted to the carriage component 24. In the illustrated embodiment of the invention, the arm component 50 is mounted to a protective casing 52 fixed to the carriage frame 40. The protective casing 52 protectively encloses mechanic and/or hydraulic components that are used to control the device 10 as will be hereinafter disclosed.

In a preferred embodiment of the invention, the arm component 50 is not only fixed to the protective casing 52 but pivotally mounted on the latter by an arm pivotal bracket 54. When the arm component 50 is pivotally mounted to the carriage component 24, an arm pivoting means for pivoting the arm component 50 about its corresponding arm pivotal bracket 54 is also provided. The arm pivoting means preferably takes the form of an arm pivoting piston 53 extending between a pair of pivoting piston mounting brackets 45, 58 respectively mounted on the carriage component 24 and the arm component 50.

Figure 5:
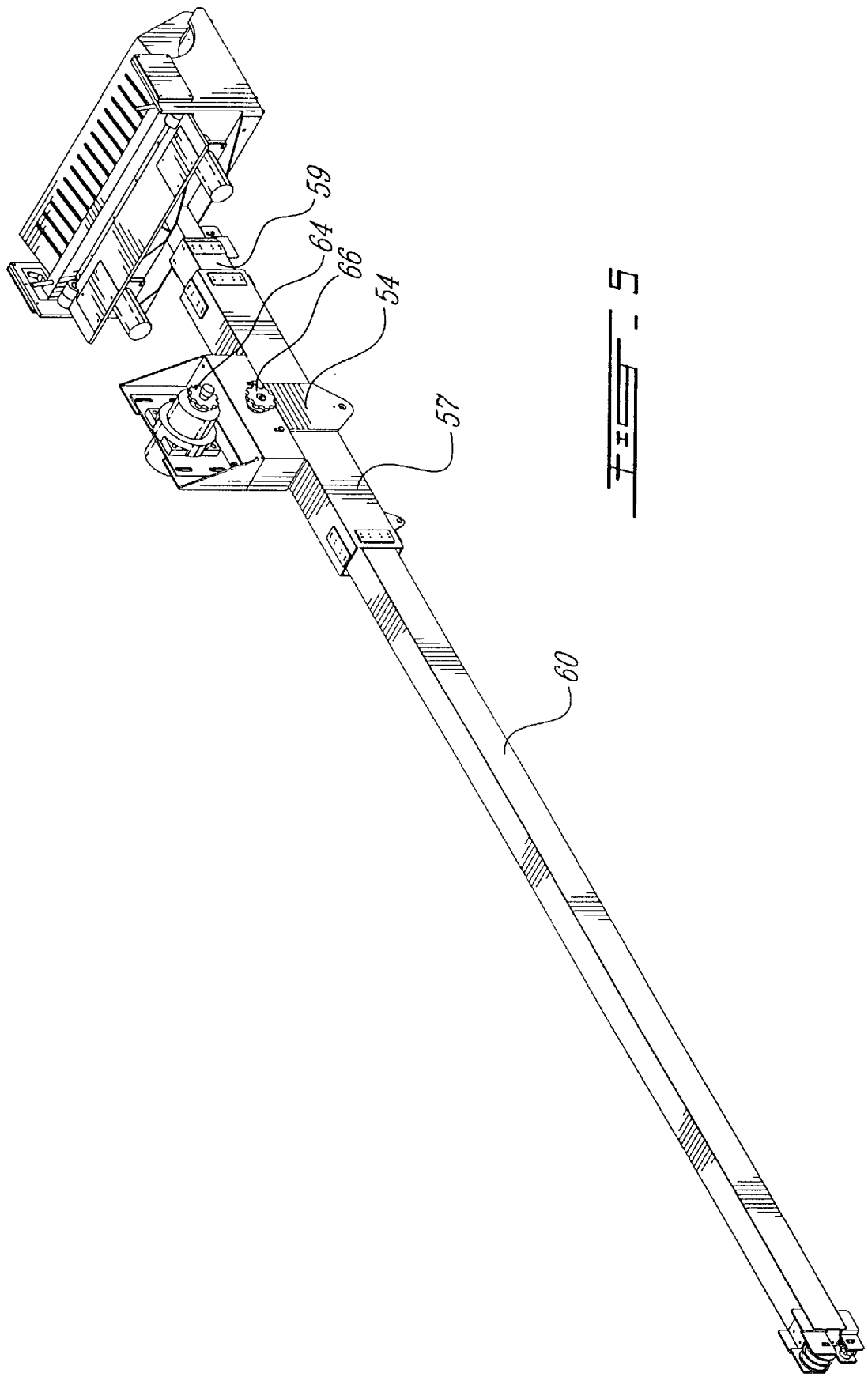
FIG. 5 is a front perspective view of the arm and rake portion of a trash rack cleaning device.
Figure 6:
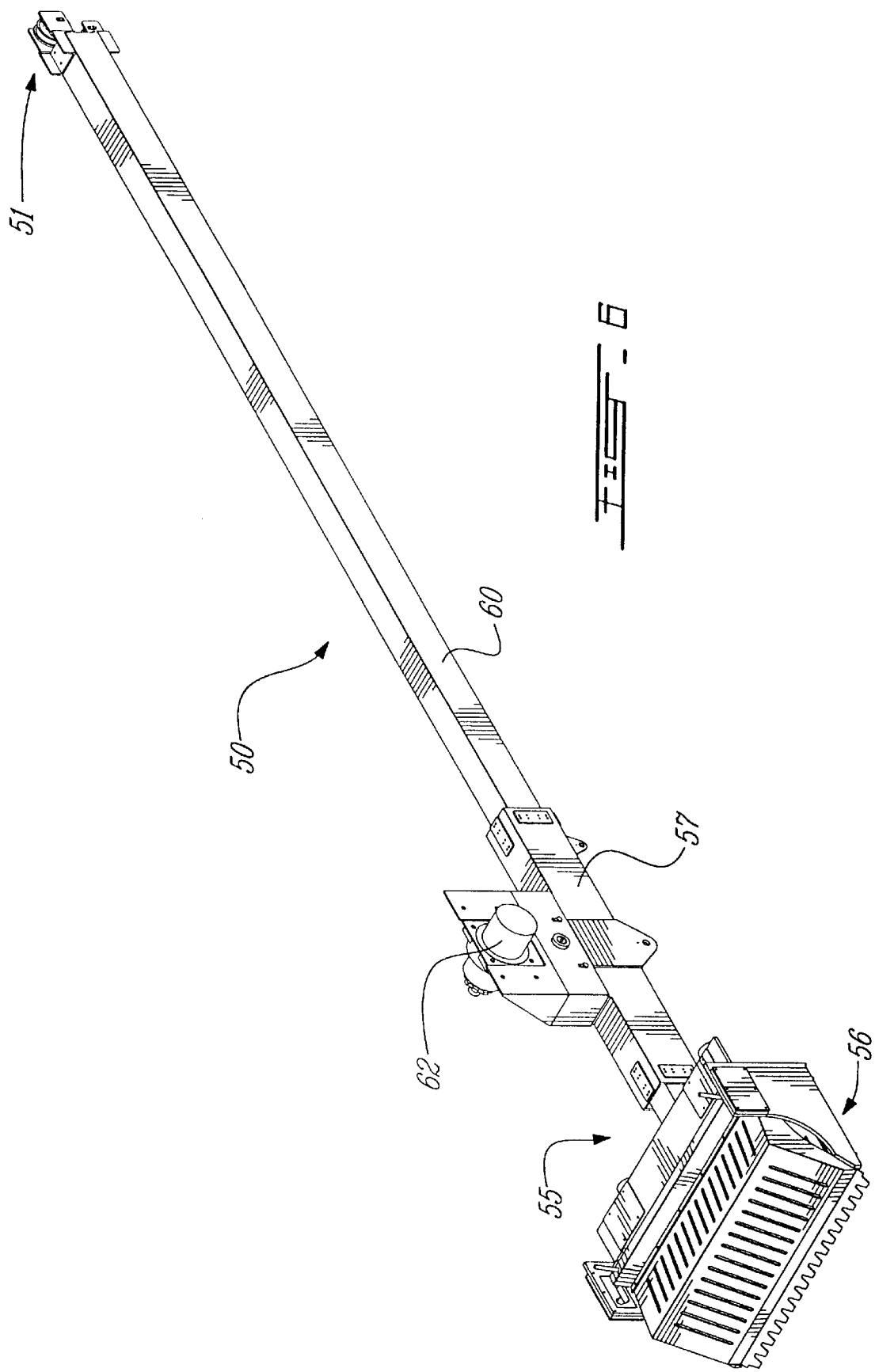
FIG. 6 is a rear perspective view thereof.
Figure 7:
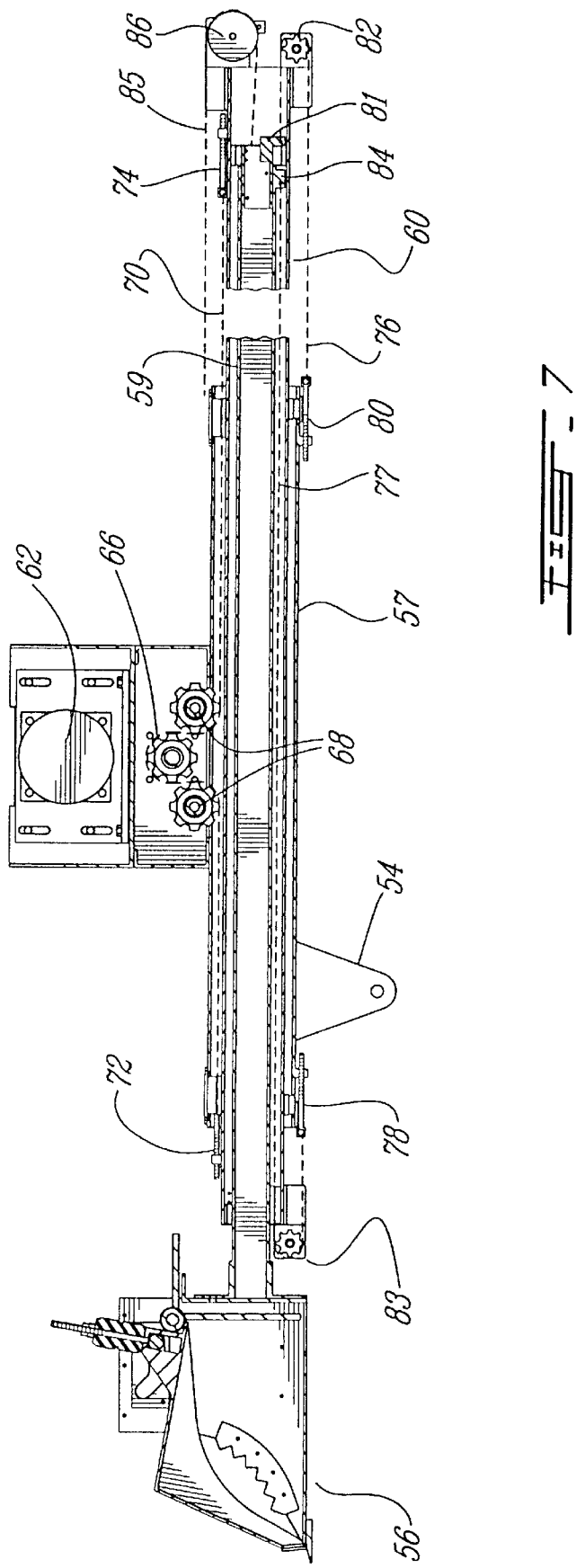
FIG. 7 is a side elevational view, partially in cutaway, of the arm and rake components of the trash rack cleaning system.

The arm component 50 is illustrated more specifically in FIGS. 5 through 7. The arm component 50 defines an arm proximal end 51 and a longitudinally opposed arm distal end 55. Debris-manipulating means for manipulating debris positioned on or adjacent the trash rack 18 is mounted on the arm component 50 adjacent the arm distal end 55. The arm component 50 is preferably provided with an arm length adjustment means for adjusting the distance between the arm proximal end 51 and the arm distal end 55. In a preferred embodiment of the invention, the arm length adjustment means takes the form of at least two arm segments that are telescopically mounted relative to each other. The arm component 50 thus preferably defines an outer segment 57 and at least one arm inner segment 60. It should be understood that the arm component 50 could include a plurality of arm inner segments 60 without departing from the scope of the present invention. The arm inner segment 60 is slidably inserted at least partially within the arm outer segment 57.

A motor means 62 is mounted preferably on the arm outer segment 57. The motor means 62 is mechanically coupled to an output shaft 64 having a driving gear 66 mounted thereon. The driving gear 66, in turn, is mechanically coupled to a pair of driven gears 68. The driven gears 68 are, in turn, mechanically coupled to a driving chain 70. The driving chain 70 extends between a pair of driving chain pulleys 72 and 74 respectively mounted on both ends of the arm inner segment 57. When driving chain 70 drives the arm into an extended position, a first auxiliary chain 76 rotates on gear 82 between the two pulleys 80 and 81. This motion drives a second auxiliary chain 77 that rotates on gear 83 between pulleys 84 and 78. The motion of the arms activates movement of the hydraulic hoses 85.

The debris-manipulating means is illustrated more specifically in FIGS. 9 through 14. The debris-manipulating means 56 includes a fixed jaw 84 and a moving jaw 86. The fixed jaw 84 is adapted to be rigidly mounted to the distal end 54 of the arm component 50. The fixed jaw 84 preferably includes a fixed jaw bottom wall 88 having a fixed jaw rear wall 90 and a pair of opposed fixed jaw side walls 92 extending substantially perpendicularly from its peripheral edges. A scraping blade 94 preferably having a generally frontwardly beveled configuration is rigidly mounted to the fixed jaw bottom wall 88 adjacent its front peripheral edge 96. Both the fixed jaw 84 and the mobile jaw 86 are preferably provided with jaw slots 124 formed therein for allowing true flow of water therethrough while retaining debris.

The debris-manipulating means 56 also includes a jaw moving means for moving the mobile jaw 86 relative to the fixed jaw 84. The jaw moving means typically takes the form of at least one and preferably two jaw moving cylinders 98 that are mounted on the fixed jaw back wall 90 by mounting brackets 100 and extend through the latter.

The jaw moving cylinders 98 are also connected to the mobile jaw 86 so as to provide movement to the latter. The mobile jaw 86 preferably has a generally concave configuration typically defined by a mobile jaw top wall 102 that extends integrally and at an angle with a mobile jaw front wall 104. The mobile jaw 86 also preferably includes a pair of opposed mobile jaw side walls 106.

The mobile jaw 86 is mounted so as to be pivotable relative to the fixed jaw 84. In the illustrated embodiment of the invention, a jaw pivoting axle 108 extends between a protruding section of the fixed jaw side walls 92. A pair of spaced apart mobile jaw mounting brackets 110 typically having a generally U-shaped cross-sectional configuration are mounted on both the mobile jaw top wall 102 and in an overriding relationship relative to the jaw axle 108, so as to allow pivotal movement between the mobile jaw 86 and the jaw axle 108.

One of the main features of the present invention is that in a preferred embodiment of the invention, the mobile jaw 86 is mounted on the fixed jaw 84 so as to allow not only for relative rotation of the jaws 84 and 86, but also so as to allow for a predetermined linear movement between the fixed jaw 84 and the mobile jaw 86. As can be seen, the jaw axle 108 is preferably slidably mounted at each longitudinal end thereof within a corresponding axle guiding bracket 112. Each axle guiding bracket 112 has an axle slot 114 formed therein for slidably receiving the longitudinal end of the jaw axle 108 and guiding its translational movement. Each slot 114 preferably has a slanted L-shaped configuration so as to provide a substantially cam-like action. It will be understood that the term linear movement includes movement in any plane or combination thereof.

The mobile jaw 86 is thus adapted to pivot about the jaw axle 108 between a jaw opened configuration and a jaw closed configuration wherein its distal peripheral edge 116 abuttingly contacts the blade 94. Also, the mobile jaw 86 is adapted to move linearly relative to the fixed jaw 84 between a retracted position illustrated in FIG. 10 and a fully extended position shown in FIG. 14 wherein the jaw axle 108 pushes the mobile rotating jaw 86 towards the distal segment of the slot 114. Thus, in a jaw extended position, the distal edge 116 of the mobile jaw 86 is in a spaced relationship relative to the blade 94. The combination of the rotational and linear movement of the mobile jaw 86 relative to the fixed jaw 84 aids in the efficient operation of the device.

A slot cover plate 118 is preferably mounted on the exterior surface of the fixed jaw side walls 92 in an overlying relationship with the external surface of the guiding plates 112 so as to prevent debris or other foreign objects from exteriorly penetrating within the slot 114 and blocking the latter. Also, a cylinder-protecting plate 120 preferably extends rearwardly from the mobile jaw 86 in an overlying relationship relative to the latter.

Figure 9:
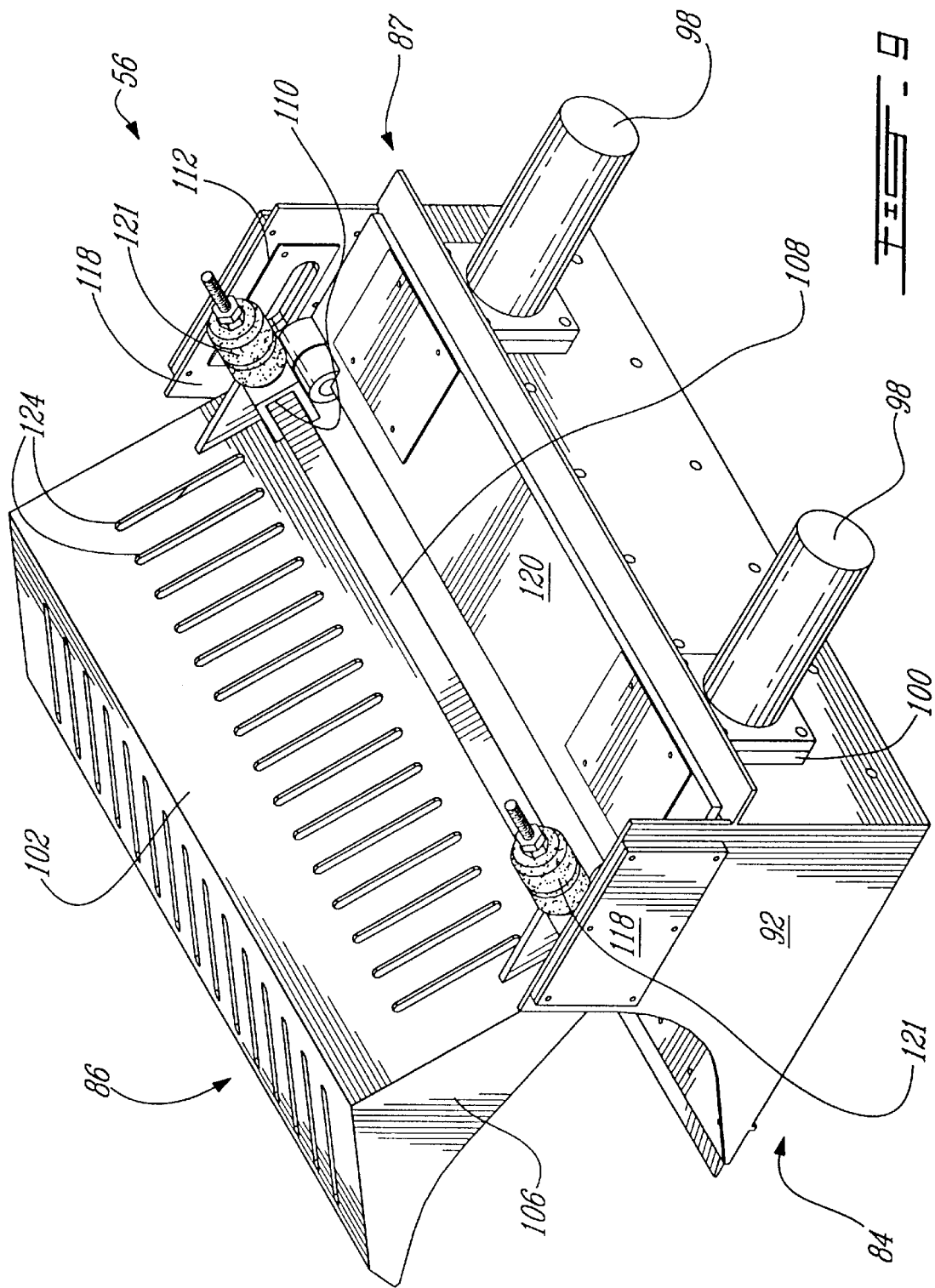
FIG. 9 is a rear perspective view of the rake component of the trash rack cleaning device.
Figure 10:
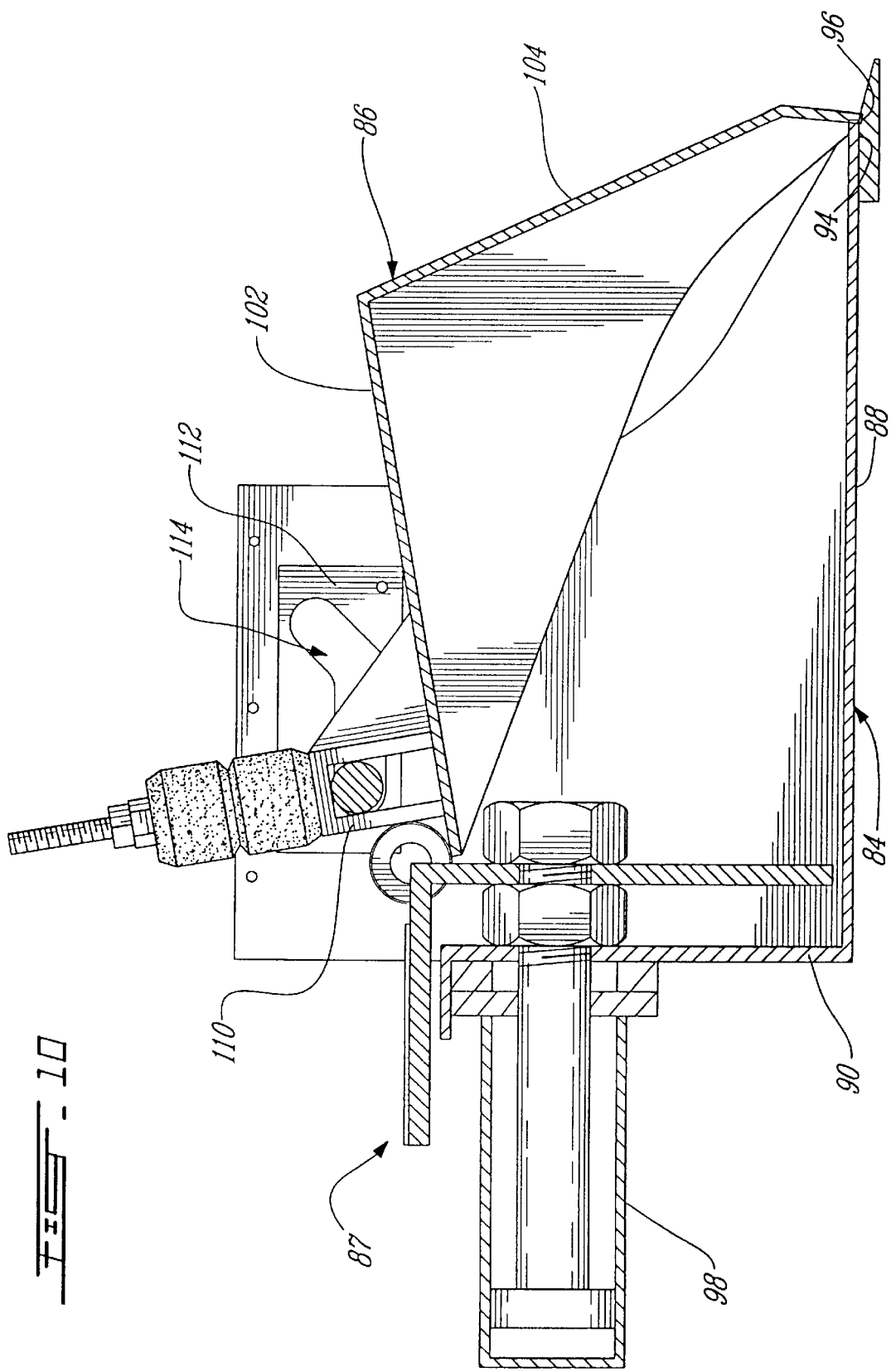
FIG. 10 is a side sectional view of the rake component with the mobile jaw in a completely retracted position.
Figure 11:
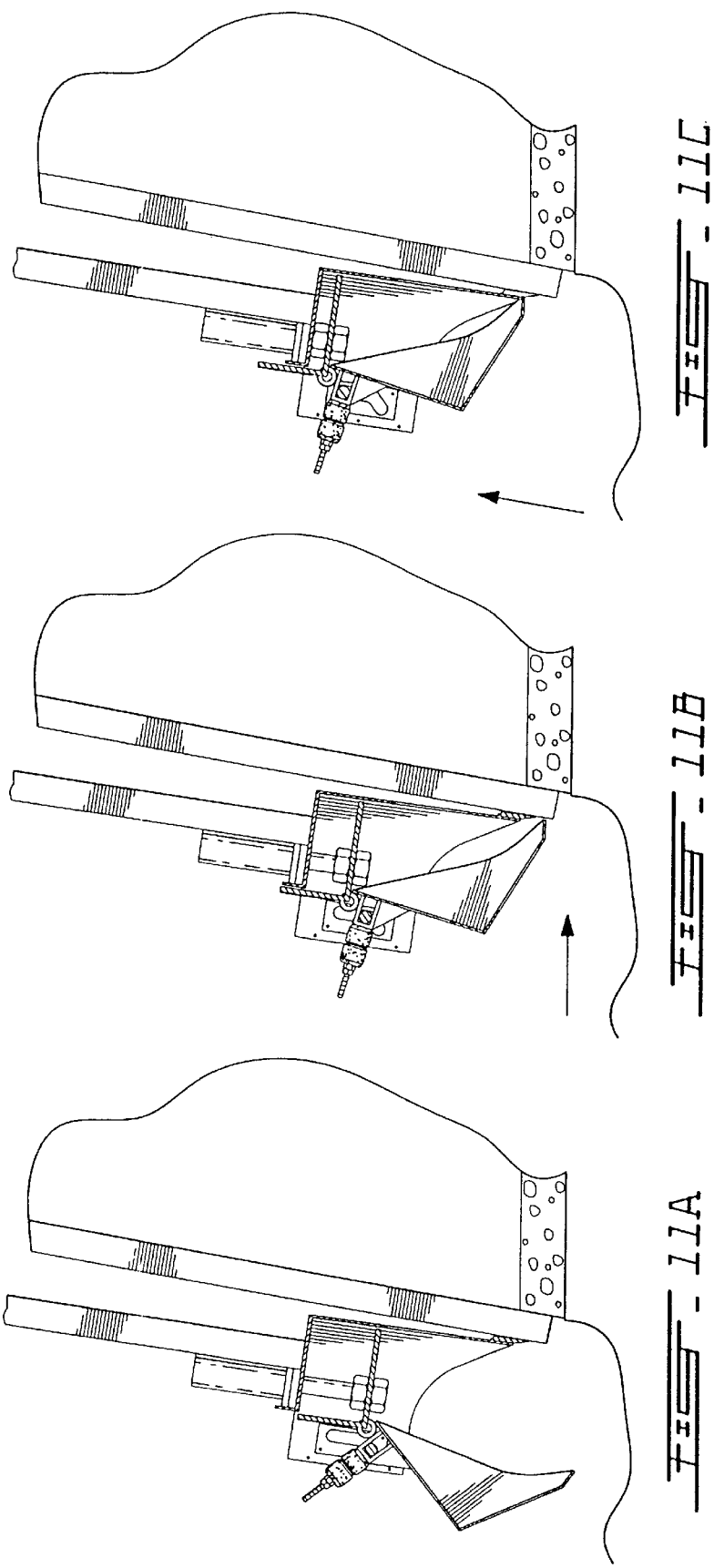
Figure 12:
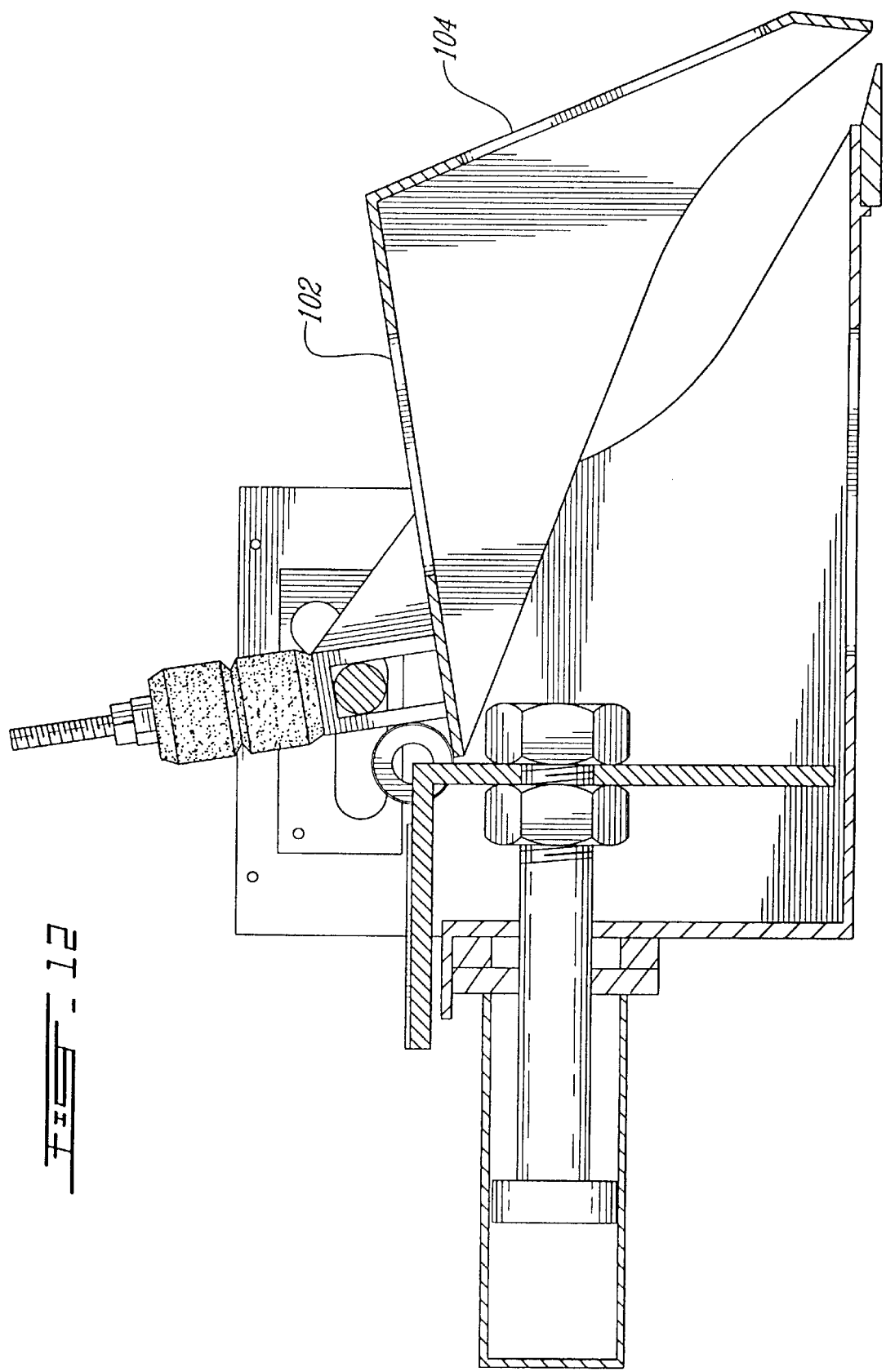
FIG. 12 is a sectional view of the rake component with the mobile jaw in a partially opened position.
Figure 13:
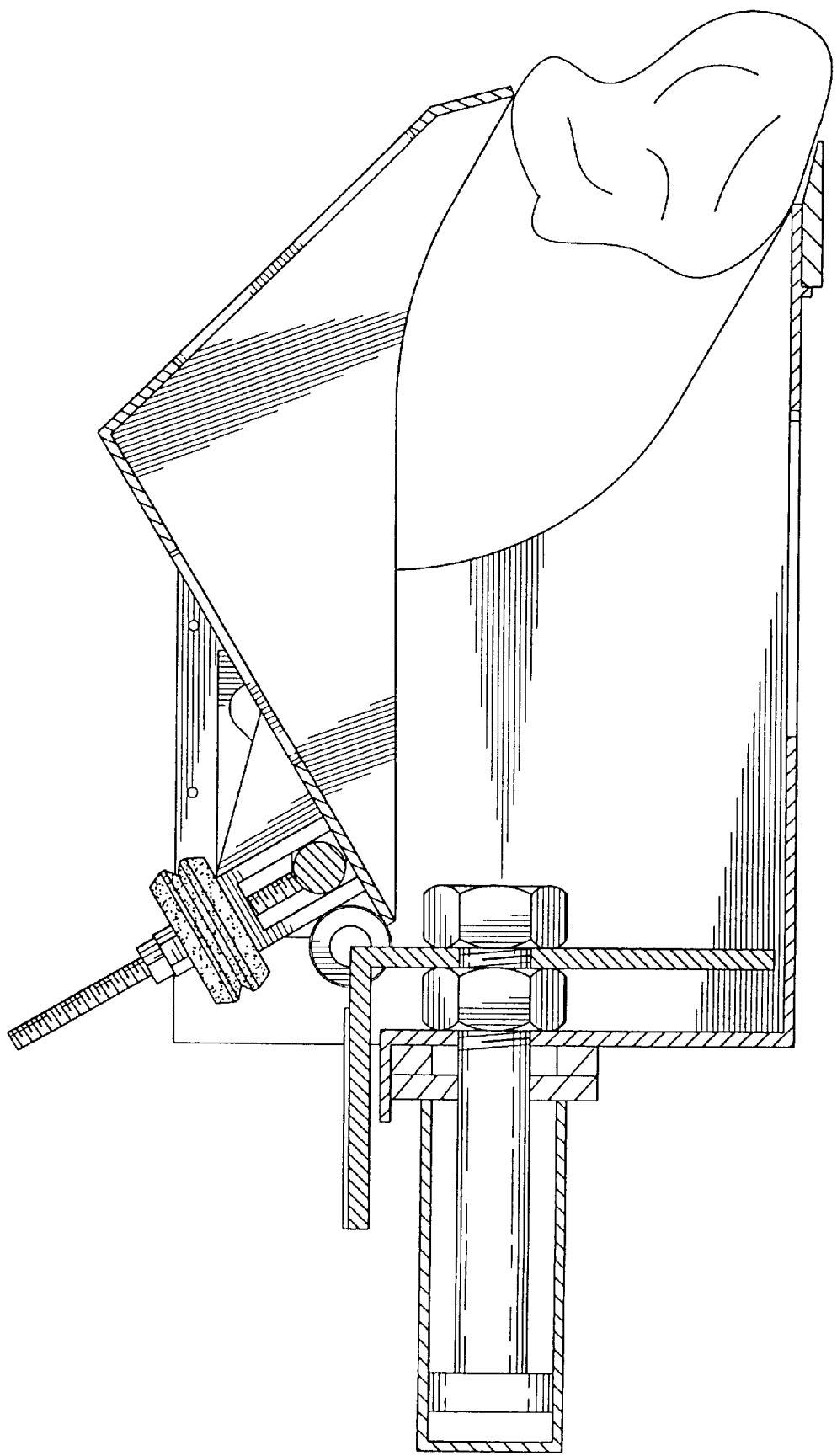
FIG. 13 is a side sectional view showing the progression of the opening of the mobile jaw.
Figure 14:
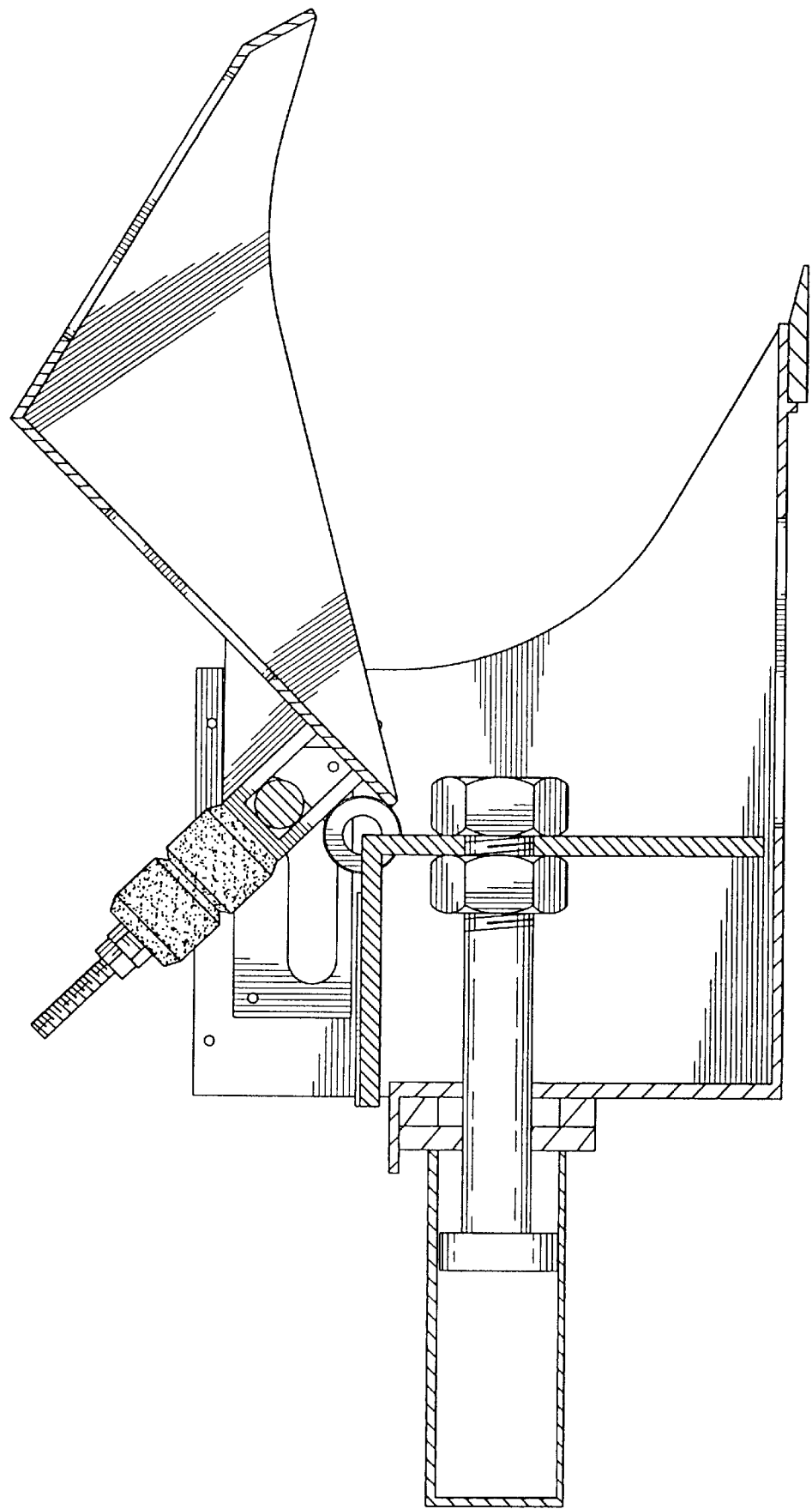
FIG. 14 is a side sectional view illustrating the mobile jaw in a fully open position.
Figure 15:
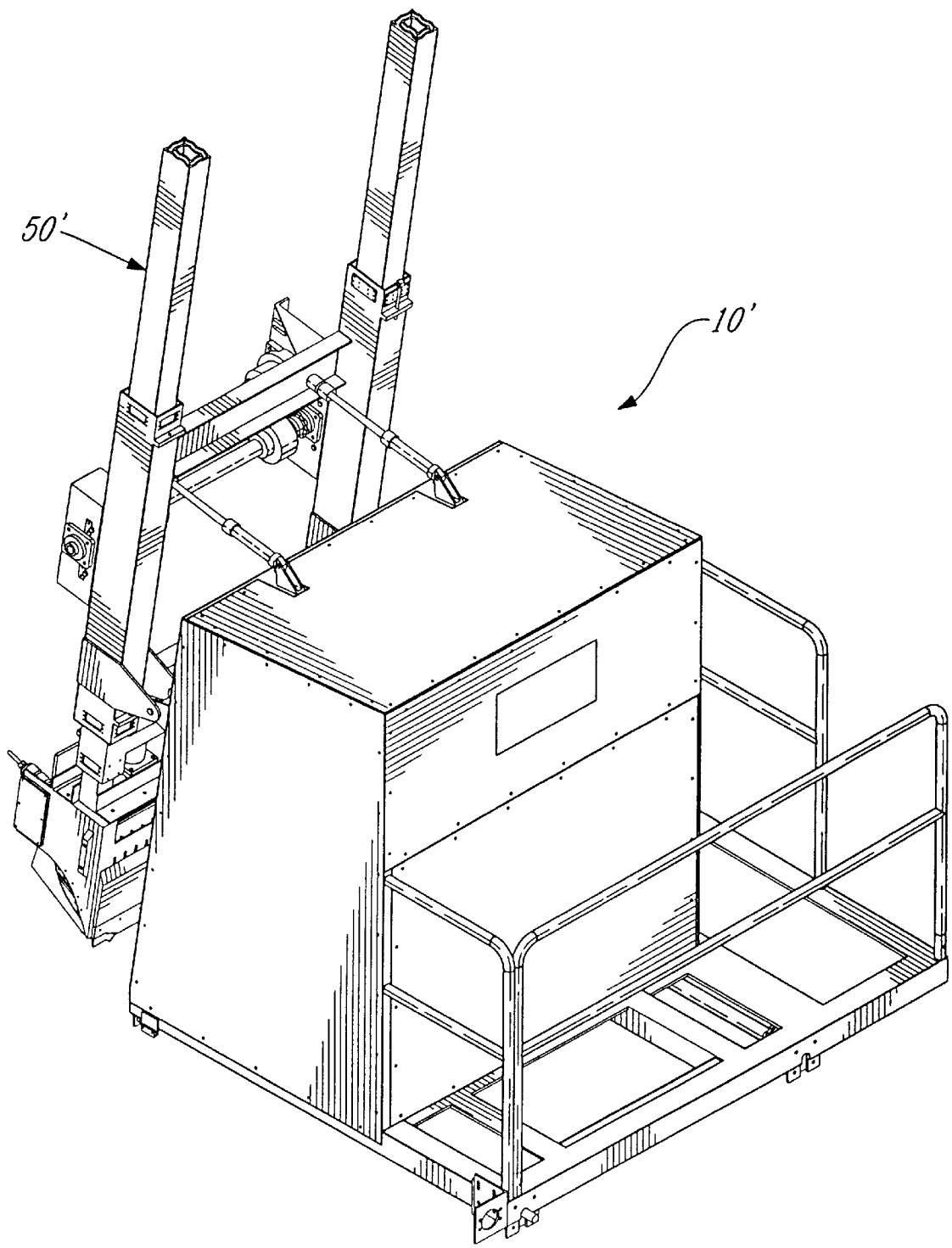
FIG. 15 is a rear perspective view of a further embodiment of a trash rack cleaning device according to the present invention.
Figure 16:
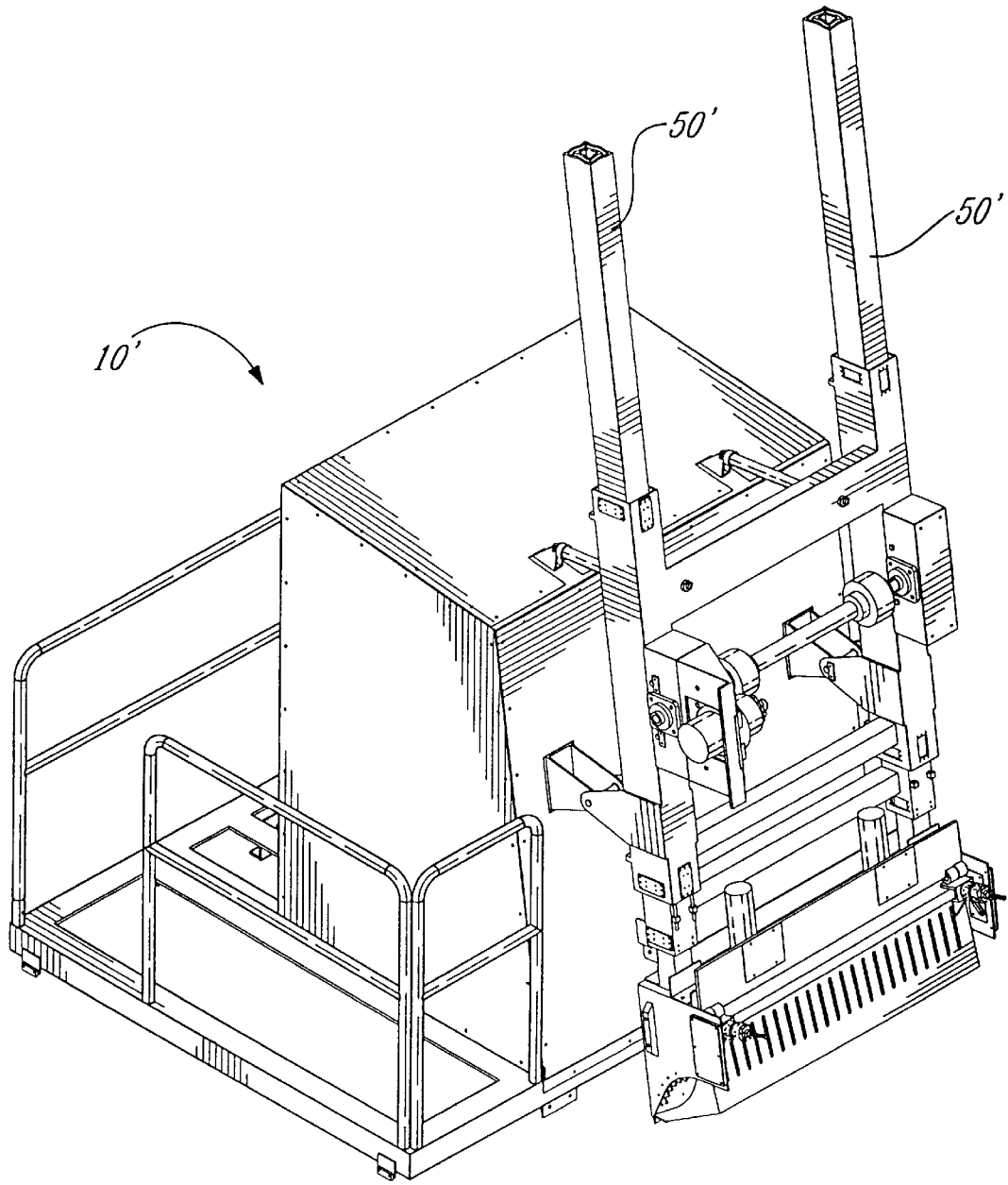
FIG. 16 is a front perspective view thereof.
Figure 17:
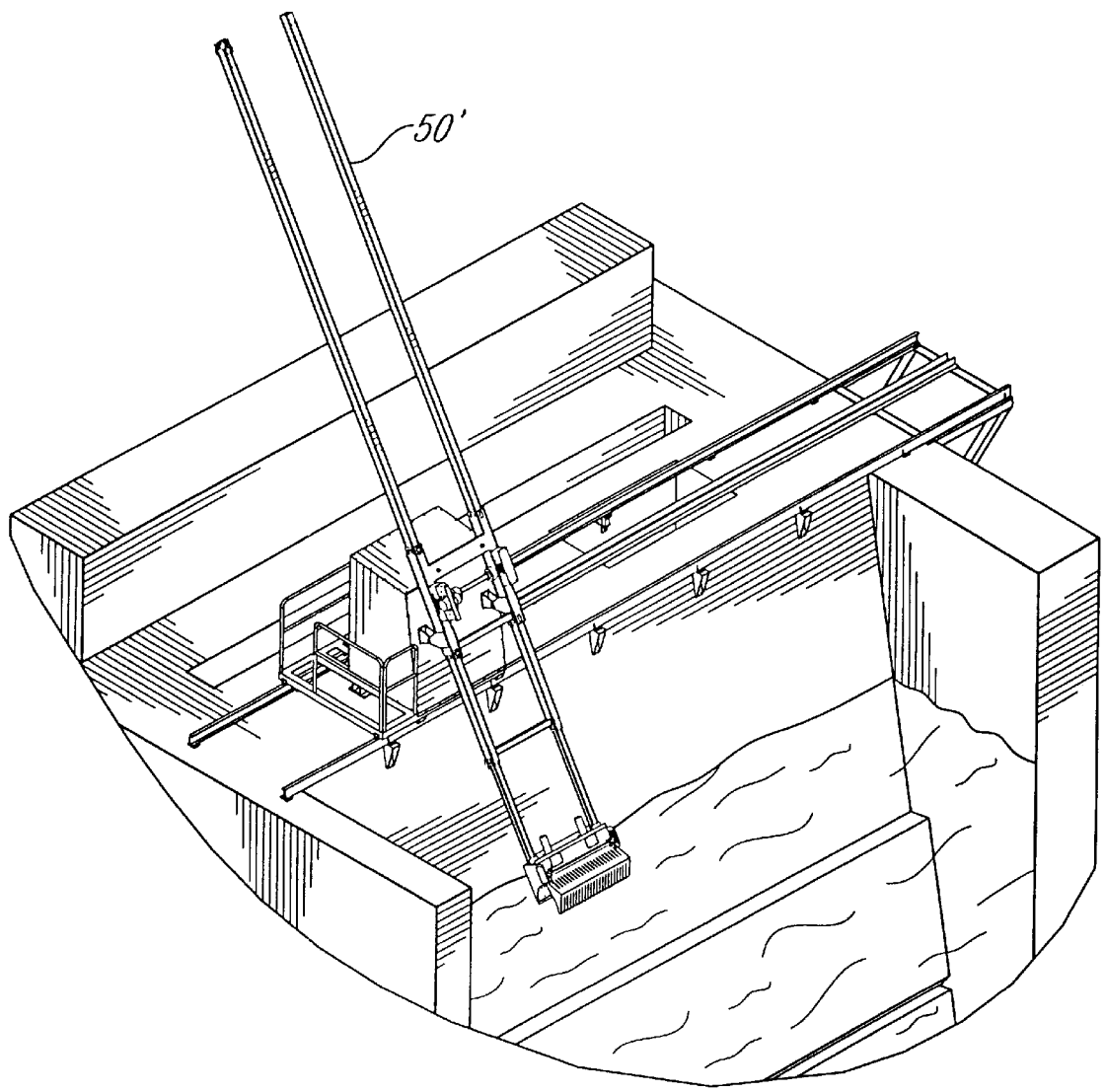
FIG. 17 is a front perspective view of the embodiment of FIGS. 15 and 16 mounted on guide rails.
Figure 18:
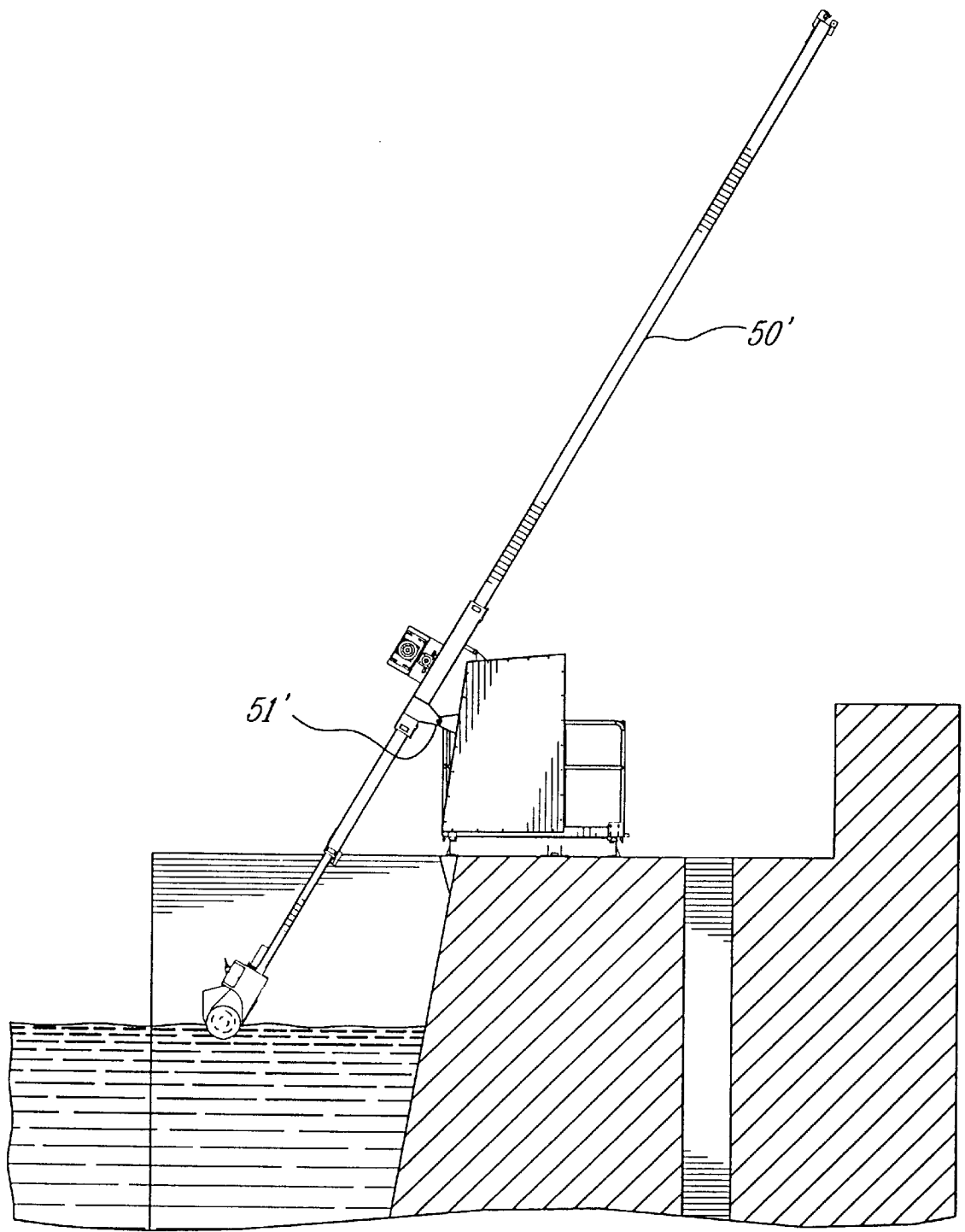
FIG. 18 is a side elevational view thereof.

A biasing means for biasing the mobile jaw 86 towards the mobile jaw closed and retracted configuration illustrated in FIGS. 9 and 10 is preferably also provided. In one embodiment of the invention, the jaw biasing means may take the form of spring pads 121 mounted on a pair of corresponding rods 122 that extend from the brackets 110. Thus, as shown in FIG. 13, spring pads 121 are in a compressed condition to exert the aforementioned biasing force on mobile jaws 86.

Referring to FIGS. 15 through 18, there is shown a trash rack cleaning device 10' in accordance with a second embodiment of the present invention. The cleaning device 10' is substantially similar to the cleaning device 10 and thus similar reference numerals will be used to denote similar components. One of the main differences between the cleaning device 10' and the cleaning device 10 resides in that a pair of arm members 50' instead of the single arm member 50 form the longitudinally extending member or means. The use of two arm members 50' instead of a single arm member 50 allows the arm members 50' to be extended over a relatively great length without the risk of warping or being otherwise damaged. In other words, the use of two arm members 50' increases the overall structural stability and rigidity of the device 10' so as to allow for device 10' to dislodge debris located relatively deep and even within relatively turbulent flows without the risk of having the arm component being damaged. Arm members 50' are pivotably mounted as indicated by reference numeral 51'.

In use, the carriage component 24 is moved along the rail 26 until the carriage component 24 is in a substantially overlying relationship relative to the trash rack 18. The arms 50 or 50" are then extended so that the debris-manipulating means 56 is positioned adjacent the trash rack 18. The pivotal movement about the arm distal end 54 allows for compensation of the variations in the specifications of the trash rack and associated structure upon which the device 10 or 10' is to work. In other words, the pivotal action of the arm component 50 or 50" about the arm distal end 54 allows for ideal positioning of the debris-manipulating means 56 on the trash rack 18 regardless of the variations that may occur either during manufacturing, insulation or actual use of the trash rack 18. By providing an ideal positioning of the debris-manipulating means 56 on the trash rack 18, the devices 10 and 10' reduce wear on both the trash rack 18 and the cleaning device itself Hence, it increases longevity of both the trash rack and the cleaning device and improves the efficiency of the cleaning operation.

Another feature of the present invention resides in the specific construction of the arm components 50 and 50" that can be lowered into a relatively turbulent current and at a relatively great depth with minimal danger of warping or otherwise damaging the components. The arm components 50 and 50" may be lowered towards the bottom of the trash rack 18 while the blade 94 scrapes the trash rack 18 with a suitable pressure.

Another main feature of the present invention resides in the fact that once the debris-manipulating means 56 has reached the position adjacent the bottom of the trash rack 18, the jaw moving cylinders 98 are activated so that the mobile jaw 86 moves linearly and pivots to an open configuration about the slot 114 as shown in FIG. 11A. The linear action of the mobile jaw 86 allows the latter to reach and grasp debris that has been pushed by the blade 94 away from the latter. Hence, contrary to prior art devices, the mobile jaw 86 ensures that all the debris having been scraped by the by the blade 94 can be reached.

Figure 8:
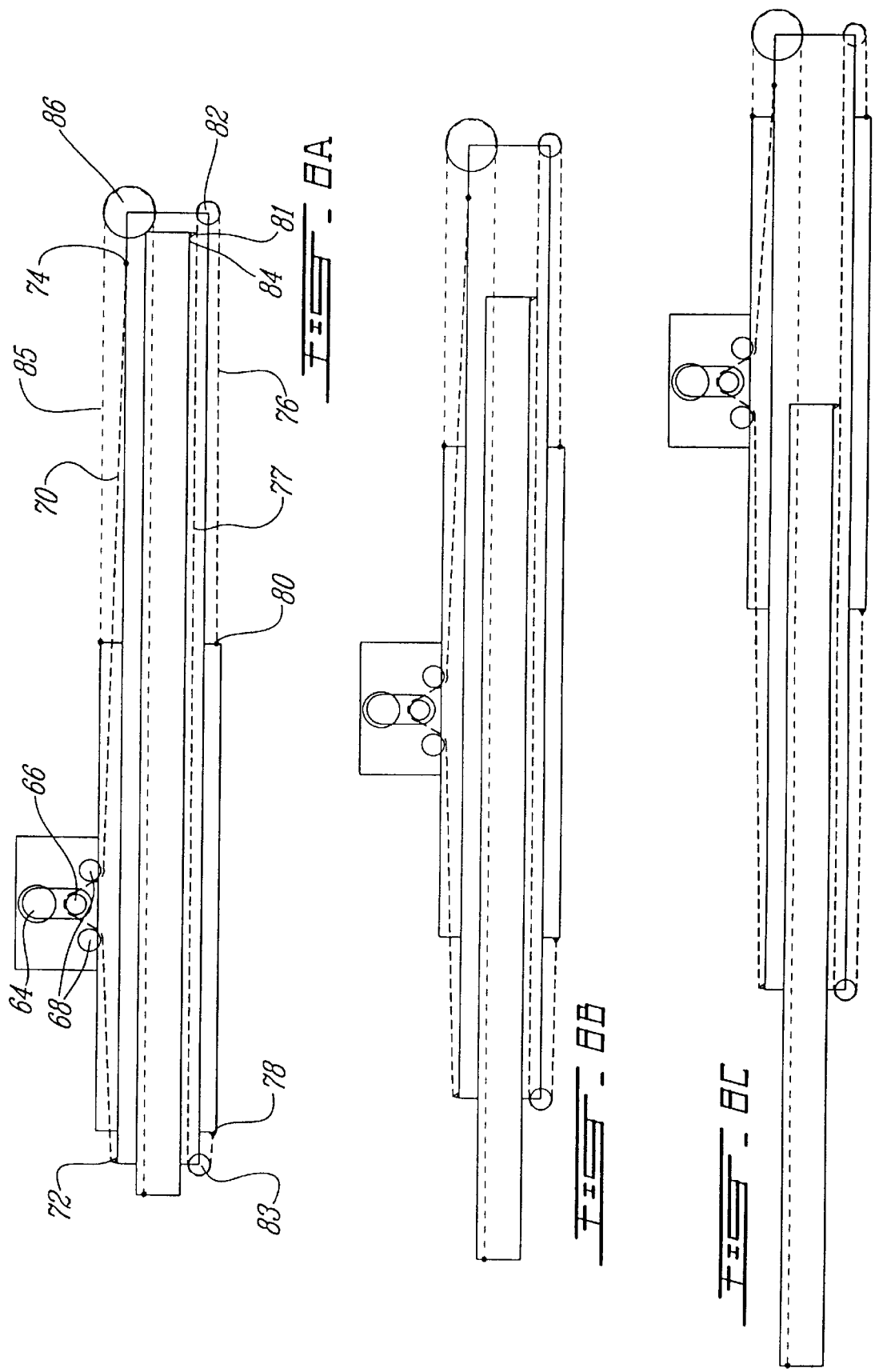
FIGS. 8A, 8B and 8C are views illustrating the elongation and retraction of the arm segments of the arm and rake components.

The mobile jaw 86 is then retracted towards its closed configuration illustrated in FIGS. 8 and 9 by the biasing means or otherwise and as illustrated in FIG. 11B. Once the mobile jaw 86 is in its closed configuration, the arm components 50 and 50' pull the debris-manipulating means 56 towards the surface of the volume of liquid as shown in FIG. 11C. The debris contained within the debris-manipulating means 56 can then be discarded in a usual manner.

One of the main advantages of the present invention resides in that the nibbling capacity to allow the device to divide relatively large debris into smaller debris and thus eliminates the need for oversizing the device so as to be able to clean relatively large debris that are only seldom encountered. The nibbling operation can also be performed for allowing the raking component to travel through relatively large solid obstacles during its cleaning cycle.

I claim:

1. A cleaning device for removing debris located adjacent a trash rack, said trash rack including at least two trash bars positioned in a relatively parallel relationship relative to each other so as to define at least one corresponding flow channel therebetween, said cleaning device comprising:
   a device mounting base for mounting said device adjacent said trash rack;
   a longitudinally extending member movably mounted on said device mounting base, said longitudinally extending member having a first end and a longitudinally opposed distal end;
   drive means for moving said longitudinally extending member relative to said device mounting base in a direction generally parallel to a longitudinal axis of said longitudinally extending member,
   a debris collecting means for collecting said debris, said debris collecting means being mounted on said longitudinally extending member adjacent said distal end, said debris collecting means including:
      a fixed jaw mounted on said longitudinally extending member and a mobile jaw movably connected to said fixed jaw by a jaw connecting structure, said jaw connecting structure allowing said mobile jaw to both pivot and move linearly with respect to said fixed jaw; and said fixed jaw has a fixed jaw bottom wall and a pair of fixed jaw side walls extending therefrom, an axle mounted on said fixed jaw, said mobile jaw being pivotably mounted on said axle, an axle guiding means for allowing said axle to move within said axle guiding means to thereby permit said mobile jaw to move linearly with respect to said fixed jaw.

2. The cleaning device of claim 1 wherein said device mounting base is mounted on a rail to permit transverse movement of said device mounting base.

3. The cleaning device of claim 1 wherein said fixed jaw has a guiding means including a pair of guiding slots formed in each of said fixed jaw side walls, said axle extending between said fixed jaw side walls and being located at opposed longitudinal ends thereof, said axle being respectively inserted within corresponding guiding slots.

4. The cleaning device of claim 3 wherein each of said guiding slots has a generally L-shaped configuration defining a slot proximal segment extending in a direction generally parallel to said fixed jaw bottom wall and a slot distal segment extending at an angle relative to said slot proximal segment in a direction away from said fixed jaw.

5. The cleaning device of claim 1 wherein said longitudinally extending member comprises first outer and second inner sections, said first and second sections being telescopically arranged with respect to each other.

6. The cleaning device of claim 1 wherein said mobile jaw is biased with respect to said fixed jaw.

7. The cleaning device of claim 1 wherein said longitudinally extending member is pivotably mounted with respect to said device mounting base and further including drive means for pivotably moving said longitudinally extending member.

8. The cleaning device of claim 1 wherein said fixed jaw and said mobile jaw each have a plurality of slots formed therein to permit liquid drainage.

9. The cleaning device of claim 1 further including jaw drive means for moving said mobile jaw between an open position and a closed position.

10. The cleaning device of claim 1 wherein said fixed jaw has a beveled scraping portion secured to said fixed jaw bottom wall.

11. The cleaning device of claim 1 wherein said longitudinally extending member comprises an arm.

12. The cleaning device of claim 11 further including a second arm mounted on said device mounting base, said second arm being parallel to said first arm.

13. The cleaning device of claim 5 wherein said drive means for moving said longitudinally extending member relative to said device mounting base comprises a chain drive for moving said telescopic sections.

14. The cleaning device of claim 5 including a chain drive extending between said first and second sections, said chain drive being operatively driven by said drive means.

15. The cleaning device of claim 14 further including first and second auxiliary chains, said first and second auxiliary chains extending between pulleys mounted on said first outer section.

* * * * *